March 12, 1946.   C. VON DEN STEINEN   2,396,617
MEASURING INSTRUMENT FOR DETERMINING THE ORBITAL
ACCELERATION AND THE FUNCTIONS THEREOF
Filed Sept. 28, 1939
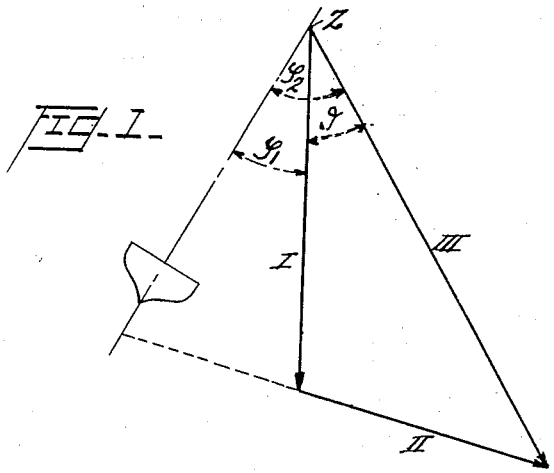
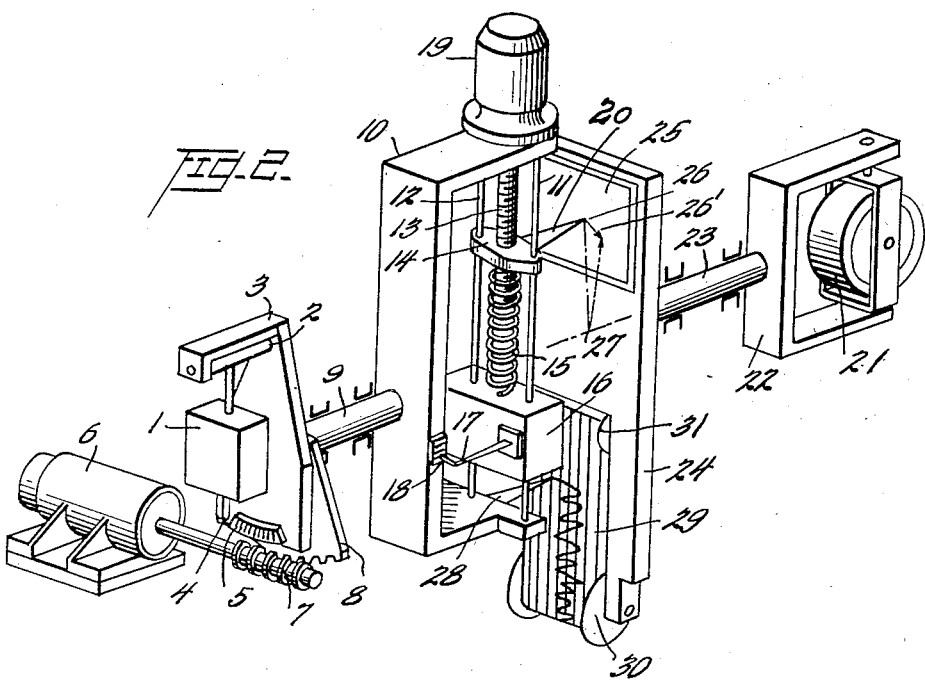
Inventor
Carl von den Steinen
By [signature]
Attorney Patented Mar. 12, 1946

2,396,617

UNITED STATES PATENT OFFICE 2,396,617

MEASURING INSTRUMENT FOR DETERMINING THE ORBITAL ACCELERATION AND THE FUNCTIONS THEREOF

Carl von den Steinen, Hamburg 1, Germany; vested in the Alien Property Custodian Application September 28, 1939, Serial No. 297,006
In Germany September 14, 1938

4 Claims. (Cl. 73—178)

The invention relates to measuring devices, and it is the object of the invention to provide a device which measures the so-called orbital acceleration of a ship.

It is well known that the waves exert forces on a ship in consequence whereof movements of the ship take place. These movements consist of rotary oscillations, the axes of rotation passing through a fixed point of the body of the ship, and of a translation of the ship. As the latter movement generally takes place along a curved approximately circular line, it is termed an orbital movement, and its accelerations are termed orbital accelerations.

Heretofore, as far as I am aware, it has only been known to calculate the orbital acceleration from other measuring values instead of measuring it directly.

It is therefore the object of the invention to measure the orbital acceleration directly. According to the invention, a measuring device for determining the orbital acceleration or functions thereof comprises, in combination, a first instrument for representing the magnitude and direction of the gravity acceleration, a second instrument for representing the magnitude and direction of the apparent gravity acceleration and a recording appliance coupled with said first and second instruments for registering the magnitude and direction of said orbital acceleration as the resultant of the apparent gravity acceleration and the gravity acceleration.

A measuring device permitting the orbital acceleration or functions thereof to be read off directly as measuring value or chronologically on a record strip or shown in a diagram is particularly valuable in determining the forces exerted on a vessel by the movements of the sea and of the chronological course of such forces. The measuring of the orbital acceleration and of the functions thereof affords the possibility of investigating the connections—hitherto a great extent unknown—between movements of the sea, shape of vessel, travelling speed and travelling direction, and of drawing conclusions therefrom in regard to the effects on the stability of the vessel by the respective motions of the sea. In addition, the measuring of the orbital acceleration and the functions thereof is important in connection with questions concerning the stabilization of ships.

The invention will be more clearly understood by reference to the accompanying drawing. It is to be understood, however, that the description is not to be taken in a limiting sense, the scope of the invention being defined in the appended claims.

Fig. 1 is a diagrammatic view showing a vector diagram which serves to represent the forces assumed to be acting upon a ship due to wave motion.

Fig. 2 is a perspective view showing a measuring device according to the invention.

To begin with, the terms frequently occurring in the following may be explained and defined with reference to the vector diagram shown in Fig. 1.

If the gravity acceleration $g$ is represented in the vertical by the vector I and the orbital acceleration to be measured is joined thereto as vector II, the resultant vector III represents the value $g'$, this being the apparent, the effective or the relative gravity acceleration. Z represents the vertical axis of the ship and the angle between the vertical I and the vertical axis Z of the ship is the absolute rolling angle $\rho_1$. The angle between the apparent vertical III and the vertical axis of the ship is the effective rolling angle $\rho_2$, this being a function of the orbital acceleration. The difference between the absolute and the effective rolling angle, i. e. the angle between the vertical and the apparent vertical, is defined as effective wave slope $\theta$. This is based upon the perception that the resultant $g'$ of the acceleration, viz, the apparent vertical III, must always assume a normal position relative to the water surface.

The measuring device of the invention is characterized by two representing means, of which the first represents the vector I of the gravity acceleration and the second the vector of the apparent gravity acceleration. The simplest apparatus serving to represent the gravity acceleration may consist in a system governed by a vertical gyroscope and stabilized so as to render its position independent of the position of the ship. The apparent vertical vector may be represented in various ways. For instance an acceleration meter may be used, the measuring direction of which is automatically directed into the apparent vertical direction and its measuring value may be read off as a line of displacement proportional to the acceleration. The measuring of the acceleration in the direction of the apparent vertical has heretofore never been undertaken at all. The vector of the apparent vertical may, however, be likewise determined by means of two accelerometers operating in a plane vertical to the longitudinal axis of the ship in order to measure the components of the vector III, the measuring values being brought into relation to one another by means of a suitable mechanical appliance thus representing the direction and the magnitude of the resultant vector III.

It is advantageous according to the invention to have the measuring instrument consist of two co-axially supported systems of which one is automatically directed into the true vertical direction and the other into the apparent vertical direction. The relative movement of these two systems may be directly recorded dependent on time whereby the practically very important chronological course of the effective wave slope is obtained. If the acceleration meter is arranged on the apparent vertical device in such a way that the center of motion of the device is determined by the zero deflection of the accelerometer, the deflections of the accelerometer may be registered on the vertical system, the result obtained being a diagram, representing the apparent vertical acceleration $g'$ and the effective wave slope $\theta$.

Fig. 2 represents a measuring device according to the invention. The device consists of a first system or means 21 for representing the vector of the gravity acceleration, this including a gyro-vertical with a frame 22, the latter being rigidly mounted upon an axle 23, which is axially stable relative to the body of the ship and parallel to the longitudinal axis of the ship. The axle 23 is rigidly connected with a record support 24 having the shape of an elongated rectangle the long sides of which always run in the direction of the true vertical as the axle of the gyro-rotor bearing ring always runs in the true vertical direction.

Two fixed points 26 and 27 are marked on the record support 24, the point 27 being in the axis of axle 23 while 26 lies a distance $g$ from the point 27, $g$ representing the gravity acceleration. The line joining 26 and 27 is parallel to the long sides of the rectangle of the appliance and always runs in the direction of the true vertical, so that it represents the vector $g$ of the gravity acceleration. When the gravity acceleration $g$ is zero, the point 26 coincides with the point 27 and therefore the point 27 represents the zero deflection of the instrument for determining the gravity acceleration.

The second part of the system or means for representing the vector of the apparent gravity acceleration consists of the elements 1—20. The most essential element is the pendulum 1, which is mounted on an axle 2 supported by a frame 3 which is rigidly connected to an axle 9 supported to move with the body of the ship. The axle 2 is arranged parallel to and in the longitudinal axis of the ship. The pendulum 1 tends to direct itself automatically into the apparent vertical as the result of gravity and orbital action. According to the invention, an accelerometer 10—20 is provided, which is automatically directed into the apparent vertical by means of the pendulum 1. For this purpose the frame 10 of the accelerometer is rigidly mounted on an axle 9, the axes of rotation of 9 and 23 being co-axial. The axle 9 is movably supported for rotation with its axis in fixed position relative to the body of the ship. The axle 9 is rigidly connected to a segment 8, engaging a worm-wheel 7, so that the axle 9 is turned together with the frame 10, when said segment is turned. The worm wheel is fixedly supported on an axle of an electromotor 6, which is controlled by the pendulum 1. The operation of the motor can be adjusted by means of a potentiometer resistance 5, this latter being mounted on the frame 3 and forming a part of the circuit of said motor (not shown). The resistance can be varied by means of a contact arm 4, which is rigidly connected with the pendulum 1. Therefore, when the pendulum swings, the motor is actuated and consequently the segment 8 is moved, so that the axle 9 turns to an extent permitting the frame 10 to be directed into the apparent vertical.

The frame 10 has two rods 11 and 12, on which a member 14 is slidably mounted, said member engaging a screw spindle 13, which can be rotated by means of an electro-motor 19. The member 14 carries a spring 15 which is connected with a heavy weight 16, this weight being slidably mounted on the rods 11 and 12.

The frame 10 is provided with a potentiometer resistance 18, which forms a part of the electrical circuit (not shown) of the motor 19, thus adjusting the motor if a tap or contact member 17 of the potentiometer slides thereon. The tap 17 is attached to the heavy weight 16 and is deflected if the weight 16 slides along the rods 11, 12. The member 14 is provided with a pen 20.

Downward movement of weight 16 and tap 17 from a predetermined position causes rotation of motor 19 in a direction to move member 14 upwardly, thereby applying tension on spring 15, and upward movement of said weight from such position causes rotation of said motor in the opposite direction to move said member 14 downwardly and partly relieve the tension on said spring.

The accelerometer operates as follows:

When the spring 15 is automatically directed into the apparent vertical by the mechanism controlled by the pendulum, the length of the spring between said member 14 and said weight 16 represents the apparent gravity acceleration $g'$. If $g'$ has the constant value $g$ for some time, the tap 17 is so placed that the motor is at a standstill. The distance of the pen 20 from the point 27 then corresponds to the gravity acceleration $g$, and if the true and the apparent vertical have the same direction, the pen 20 will also point at 26. If $g'$ increases or diminishes, the tap will move downwardly or upwardly, respectively, thereby causing the motor 19 to turn in the one or the other direction and thus causing the member 14 to slide up or down according to the rotation of the screw spindle 13.

If $g'$ increases, the member 14 slides upwardly, i. e. it slides so as to approach the motor 19 and a corresponding movement of the tap 17 takes place together with the movement of the member 14. The sliding movement will cease as soon as the tap has again reached the first position, when $g'$ was equal to $g$. Now the distance of the pen 20 from 27 is equal to the increased value of $g'$. Therefore, the line joining the point 27 and the point of the pen 20 represents the vector of the apparent gravity acceleration.

The appliance 24 is provided with a sheet 25, whereupon the pen 20 records a diagram 26' which is the diagram of the orbital acceleration, as the vector from the point 26 to any point of the diagram 26' represents the difference between the vector of the apparent gravity acceleration and the vector of the gravity acceleration, i. e. the vector of the orbital acceleration.

As it is desirable to record the wave slope $\theta$ chronologically, a second appliance is provided consisting of a registering strip 29 guided around the rollers 30 and 31. A pen 28 is further provided, said pen being rigidly mounted on the frame 10. As the angle between the angular deflections of the first system 21, 22 and the second system 1—20 is equal to the angle θ of the effective wave slope, the pen 28 records the effective wave slope on the strip 29 when the latter is moved at a constant velocity.

What is claimed is:

1. A combined device for indicating orbital acceleration or functions thereof, comprising, in combination, means for representing the vector of the true gravity acceleration, an accelerometer for representing the apparent gravity acceleration, means for directing said accelerometer automatically in the apparent vertical, and a recording appliance coupled with said first means and said accelerometer for registering an indication of said orbital acceleration as the vectorial difference between the vector of said apparent gravity acceleration and said vector of the gravity acceleration.

2. A combined device for indicating orbital acceleration or functions thereof, comprising, in combination, a structure constituting a system for representing the vector of the true gravity acceleration, a structure constituting a second system for representing the vector of the apparent gravity acceleration, means for directing automatically said first-mentioned system in the direction of the true vertical, second means for directing automatically said second-mentioned system in the direction of the apparent vertical, said systems being rotatably mounted around an axis, a recording appliance coupled with said first and said second-mentioned systems for registering the vector of said orbital acceleration as the vectorial difference between said vector of the apparent gravity acceleration and said vector of the gravity acceleration, and a second recording appliance for recording chronologically successive indications representing angular deflections of said systems around said axis.

3. A combined device for indicating orbital acceleration or functions thereof, comprising, in combination, a structure constituting a system for representing the vector of the true gravity acceleration, a structure constituting a second system for representing the vector of the apparent gravity acceleration, means for automatically directing said first-mentioned system in the direction of the true vertical, second means for automatically directing said second-mentioned system in the direction of the apparent vertical, said second-mentioned system being rotatably mounted around an axis passing through the point of the zero deflection of said first-mentioned system, a recording appliance forming a part of said first-mentioned system for recording said vector of the orbital acceleration, and a pencil supported by said second-mentioned system for recording on said appliance an indication of the orbital acceleration as the vectorial difference between said vector of the apparent gravity acceleration and said vector of the gravity acceleration.

4. A navigation device for indicating orbital acceleration or functions thereof, comprising, in combination, means for representing the vector of the true gravity acceleration, an accelerometer for representing an up and down component of the vector of the apparent gravity acceleration in a vertical plane transverse to the longitudinal axis of a ship under test, an accelerometer for representing a transverse component of the vector of the apparent gravity acceleration in the same vertical plane, said accelerometers being supported from a common member pivoted for oscillation on an axis parallel to the longitudinal axis of the ship, said accelerometers being provided with indicating means, and a recording means associated therewith for registering an indication representative of the orbital acceleration, said recording means being responsive to positioning means indicating the true vertical.

CARL von den STEINEN.